(12) United States Patent
Johnson et al.

(10) Patent No.: US 6,351,288 B1
(45) Date of Patent: Feb. 26, 2002

(54) SENSOR TILT CONTROL FOR A DIGITAL CAMERA

(75) Inventors: Glenn W. Johnson, Webster; Nelson D. Hozman, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/884,398

(22) Filed: Jun. 27, 1997

(51) Int. Cl.[7] ............... H01L 23/04; H01L 31/0203; H04N 5/225
(52) U.S. Cl. .............. 348/373; 250/239; 257/433
(58) Field of Search ................. 348/373, 374, 348/375, 376; 250/239, 208.1; 361/724; 257/777, 696, 726, 727, 694, 695, 731, 733, 433, 685; 358/482, 483, 513, 514

(56) References Cited

U.S. PATENT DOCUMENTS

| | | | |
|---|---|---|---|
| 4,457,017 A | * 6/1984 | Onogi et al. | 250/239 |
| 4,591,901 A | 5/1986 | Andrevski | 358/50 |
| 4,634,884 A | 1/1987 | Hayashimoto et al. | 250/578 |
| 4,884,145 A | 11/1989 | Kaye et al. | 358/229 |
| 4,972,079 A | 11/1990 | Blanding | 250/239 |
| 5,861,654 A | * 1/1999 | Johnson | 257/433 |

FOREIGN PATENT DOCUMENTS

| | | | | |
|---|---|---|---|---|
| EP | 348361 | * | 12/1989 | H01L/23/04 |
| JP | 1-133012 A | | 5/1989 | G02B/7/00 |
| JP | 1-133012 | * | 5/1989 | G02B/7/00 |
| JP | 5-273449 | | 10/1993 | G02B/7/00 |

* cited by examiner

Primary Examiner—Andrew B. Christensen
(74) Attorney, Agent, or Firm—David M. Woods

(57) ABSTRACT

A sensor package assembly for use with an optical assembly includes an optics base mechanism for supporting the optical assembly in relation to an optical axis, an image sensor mounted on a lead frame, and a sensor mounting frame for locating and supporting the image sensor in relation to the optical axis. The optics base mechanism has at least three optics-related locator features, and the sensor mounting frame also has at least three frame-related locator features. By fastening the optics base mechanism and the sensor mounting frame together with the image sensor interposed therebetween such that the optics-related locator features are oriented in opposed relation to the frame-related locator features with the lead frame pinched therebetween, the tilt of the image sensor is controlled relative to the optical axis.

7 Claims, 5 Drawing Sheets

SENSOR TILT CONTROL FOR A DIGITAL CAMERA

CROSS REFERENCE TO RELATED APPLICATION

FIELD OF THE INVENTION

The invention relates generally to the field of electronic photography, and in particular to techniques for mounting a sensor to an optical assembly.

BACKGROUND OF THE INVENTION

An important attribute of a digital camera is for the surface of a sensor, e.g., a charge coupled device (CCD), to be perpendicular to the optical centerline of the lens used to image a subject upon the sensor. The degree of tilt between the CCD and the optical centerline directly affects the image quality of the system. Therefore, care should be given to reduce or eliminate this tilt. For high cost/low volume cameras, the CCD is "actively aligned" to the lens. This means that each individual camera is adjusted to eliminate this tilt. Currently, this is a very expensive and time-consuming process which is impractical when manufacturing low cost/high volume cameras. Consequently, most lower cost digital cameras do not actively align the CCD. Instead, they typically mount the CCD to a very flat plate (with screws) and then mount the plate to the lens assembly. By controlling the flatness of the plate and CCD package, and the perpendicularity of the lens mount to the optical centerline, the resulting tilt can often be controlled to an acceptable degree. However, not only does the CCD plate adds cost and assembly time, but it still results in greater variation of lens/CCD tilt than can be tolerated in certain applications.

JP 1-133012 (Fujino) describes a sensor assembly in which tapered pins are used to facilitate positioning of an image sensor relative to an optical assembly. In particular, two spring-loaded tapered pins are set into the optical assembly through two openings in the lead frame of the image sensor to establish the position of the image sensor relative to the optical axis of the optical assembly. A number of problems are evident in this sensor assembly. The tapered pins are set into machined holes in the optical assembly, which allows (due to tolerances) for some variation in the position of the sensor. More importantly, the taper of the two pins does not provide adequate control of the tilt of the sensor assembly relative to the optical axis.

The problem is to provide a simple assembly system that minimizes tolerances while rigorously controlling the tilt as well as the x-y position of the sensor relative to the center line of the optics.

SUMMARY OF THE INVENTION

This invention departs from the prior art by controlling tilt without having to depend upon the flatness of a plate or the tolerance of holes through the lead frame of the sensor assembly. The present invention is directed to overcoming one or more of the problems set forth above. Briefly summarized, according to one aspect of the present invention, a sensor package assembly for use with an optical assembly includes an optics base mechanism for supporting the optics assembly in relation to an optical axis, an image sensor mounted on a lead frame, and a sensor mounting frame for locating and supporting the image sensor in relation to the optical axis. The optics base mechanism has at least three optics-related locator features, and the sensor mounting frame also has at least three frame-related locator features. By fastening the optics base mechanism and the sensor mounting frame together such that the optics-related locator features are oriented in opposed relation to the frame-related locator features with the lead frame pinched therebetween, the tilt of the image sensor is controlled relative to the optical axis.

This invention uses the surface of the lead frame (which is the sheet metal that the CCD imager is attached to) of the CCD sensor assembly to control the lens/CCD tilt. According to the preferred embodiment, the lead frame of the sensor assembly is pinched between a sensor mounting frame and an optics base mechanism in three places so that the CCD lead frame is directly located to the optics base mechanism. By eliminating the CCD plate (and not locating to the plastic part of the CCD sensor) the tolerances that affect the lens/CCD tilt are reduced. Also, the invention provides a "z-axis" assembly (all parts are assembled in the same direction), which is desirable Bower assembly time/cost) in a high volume manufacturing environment. In contrast, the assembly procedure when using a CCD plate ordinarily does not maintain a "Z-axis" approach, since the screws that attach the plate to the optics base mechanism would typically be driven in a direction opposite to the remainder of the assembly.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging systems and devices are well known, the present description will be directed in particular to elements forming part of, or cooperating more directly with, apparatus in accordance with the present invention. Elements not specifically shown or described herein may be selected from those known in the art.

Figure 1:
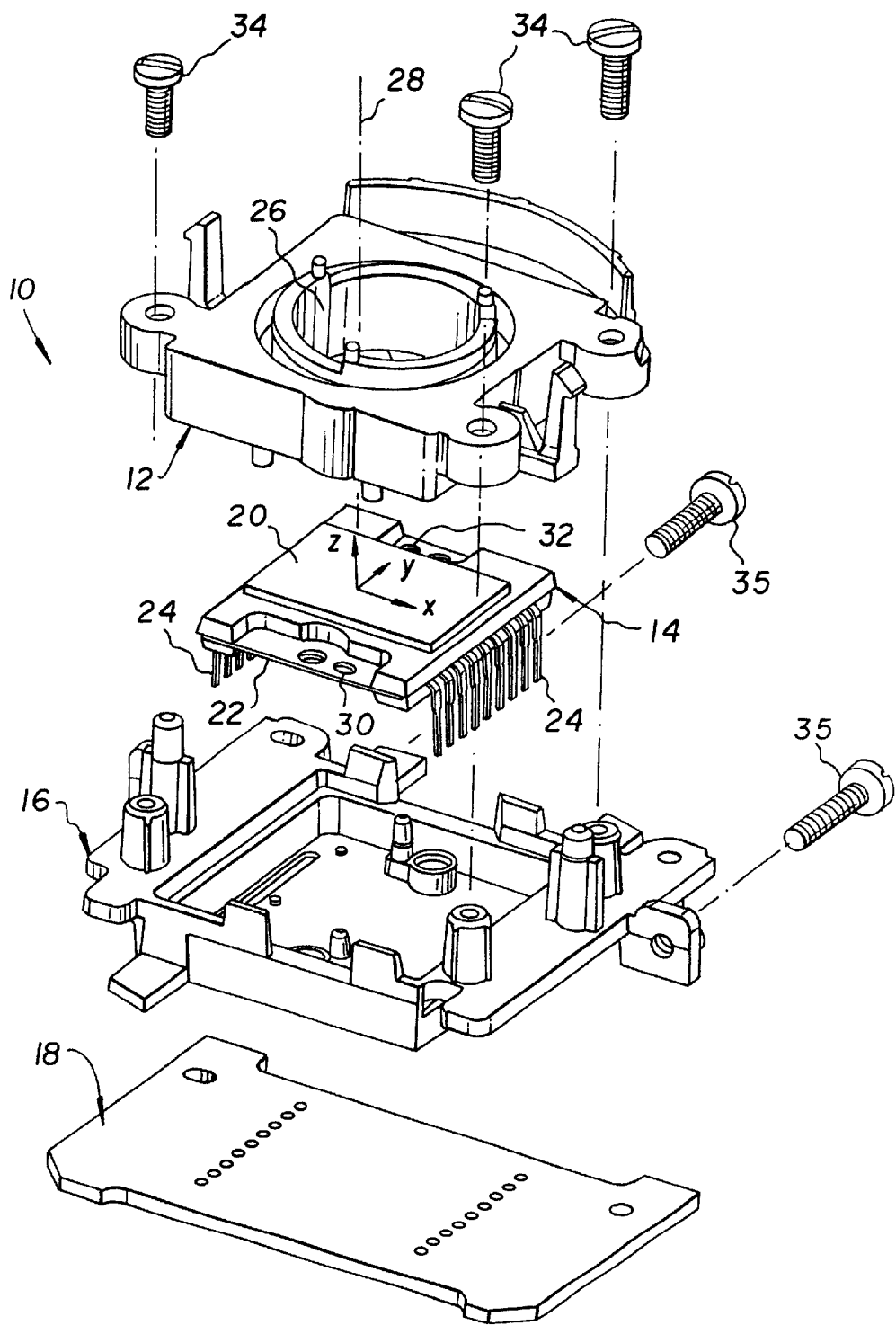
FIG. 1 is an exploded view of the sensor package assembly according to the invention.

Referring first to FIG. 1, a sensor package assembly 10 includes an optics base mechanism 12 for supporting an optical assembly (shown in FIG. 6), an image sensor assembly 14, a sensor mounting frame 16, and a printed circuit board 18. The image sensor assembly 14 includes a charge coupled device (CCD) mounted upon a lead frame 22 having electrical leads 24 extending therefrom. The optics base mechanism 12 includes an opening 26 situated relative to an optical axis 28 (also referred to as the z-axis) along which an optical assembly (shown in FIG. 6) directs an image upon the CCD 20. Ordinarily, the center line of the optical assembly corresponds to the optical axis 28. The lead frame includes holes 30, 32, which are used in controlling the x-y positioning of the CCD 20 relative to the optical axis 28 (z-axis). The sensor package assembly 10 is fastened together by screws 34 that fasten the optics base mechanism 12 to the sensor mounting frame 16 with the image sensor assembly 14 sandwiched in between (the screws 34 also fasten the optical assembly shown in FIG. 6 to the other side of the optics base mechanism 12.)

FIG. 1 shows a "Z-axis" assembly approach in which the circuit board 18, the sensor mounting frame 16, the image sensor assembly 14 and the optics base mechanism 12 are all assembled by operations oriented in the same direction, i.e., in a "z-axis" direction corresponding to the optical axis 28. The circuit board 18 and the sensor mounting frame 16 are placed onto and located by a conventional pallet fixture (not shown), which supports the circuit board 18 in reference to the sensor mounting frame 16 during the assembly process such that the circuit board 18 is in position for soldering to the leads 24 of image sensor assembly 14. The image sensor assembly 14 is then placed on the pallet fixture and located by the sensor mounting frame 16 and then soldered to the circuit board 18, e.g., by robotic means or by manual soldering. The optics base mechanism 12 is placed on the pallet fixture and located by the sensor mounting frame 16. Other parts of the lens assembly shown in FIG. 6 (lens, lens spring, retainer, and screws) are then added to complete the subassembly.

Figure 2:
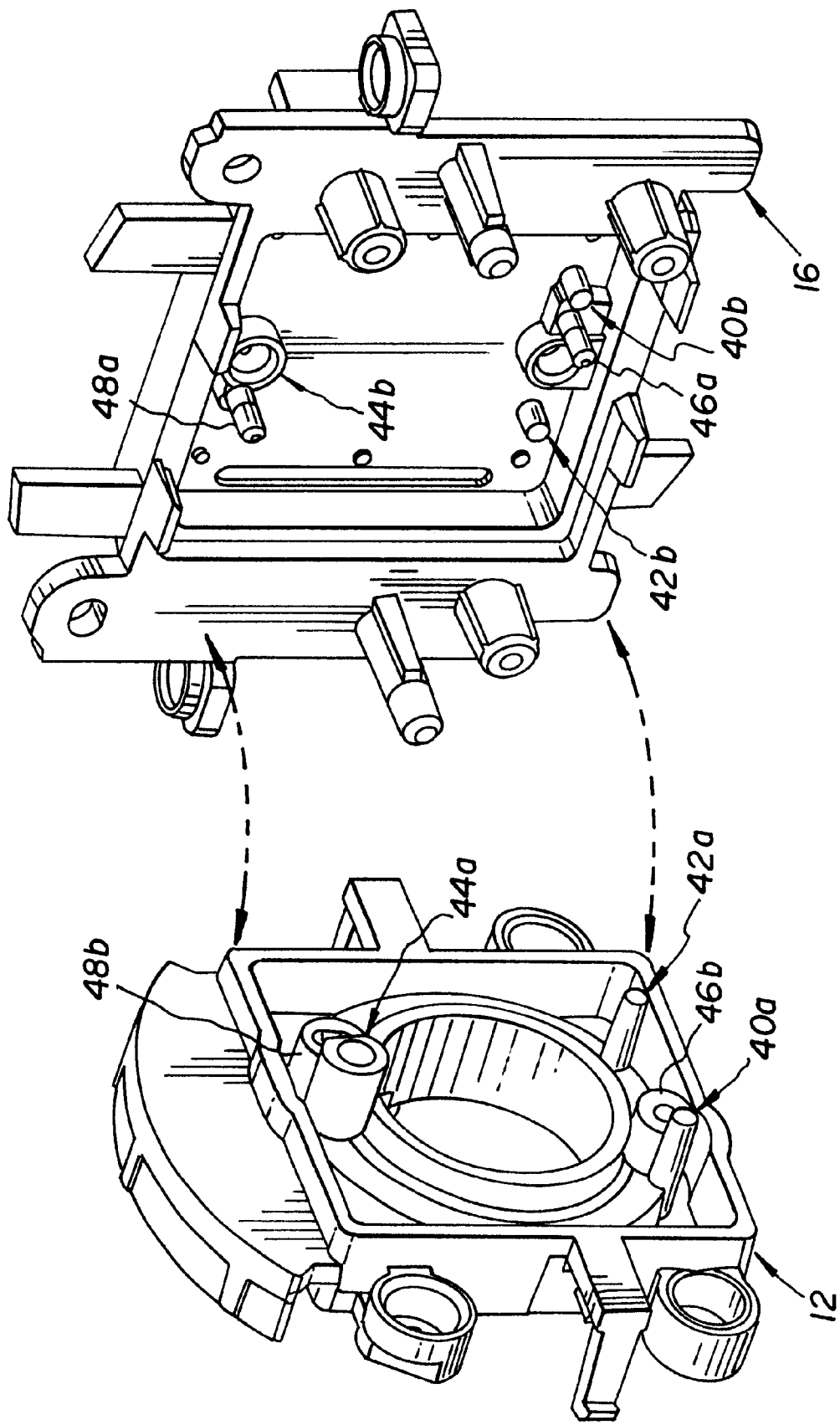
FIG. 2 is a perspective view of an optics base mechanism and a sensor mounting frame, as shown in FIG. 1, but more specifically showing the relationship of the contact features in each component.

FIG. 2 shows the features on the optics base mechanism 12 and the sensor mounting frame 16 that pinch the lead frame 22 to control tilt and that establish the x-y positioning to control center line orientation when the product is fully assembled. More specifically, in relation to tilt control, the optics base mechanism 12 includes three optics-related locator features 40a, 42a, and 44a. Features 40a, 42a and 44a constitute flat-surfaced tilt locator posts. (Although feature 44a is shown in FIG. 2 as a hollow post to conform to an unused hole in the lead frame 22, this feature could be a solid post in the absence of the hole in the lead frame). The sensor mounting frame 16 includes three frame-related locator features 40b, 42b, and 44b that generally conform to the features 40a, 42a and 44a found on the optics base mechanism 12. Features 40b, 42b and 44b constitute flat-surfaced tilt locator posts. (As before, the post 44b could be a solid post in the absence of the lead frame hole.) The features 40a and 40b, 42a and 42b, and 44a and 44b are respectively positioned to oppose each other in the assembled product, and to pinch the lead frame in between. Note that these features should be dimensioned and toleranced such that the lead frame 22 is reliably and effectively pinched between them when the assembly is completed. Failure to establish these dimensions could result in a poor lens/sensor tilt alignment since the lead frame 22 would not necessarily be located to the optics related features 40a, 42a, and 44a on the optics base mechanism 12.

Figure 3:
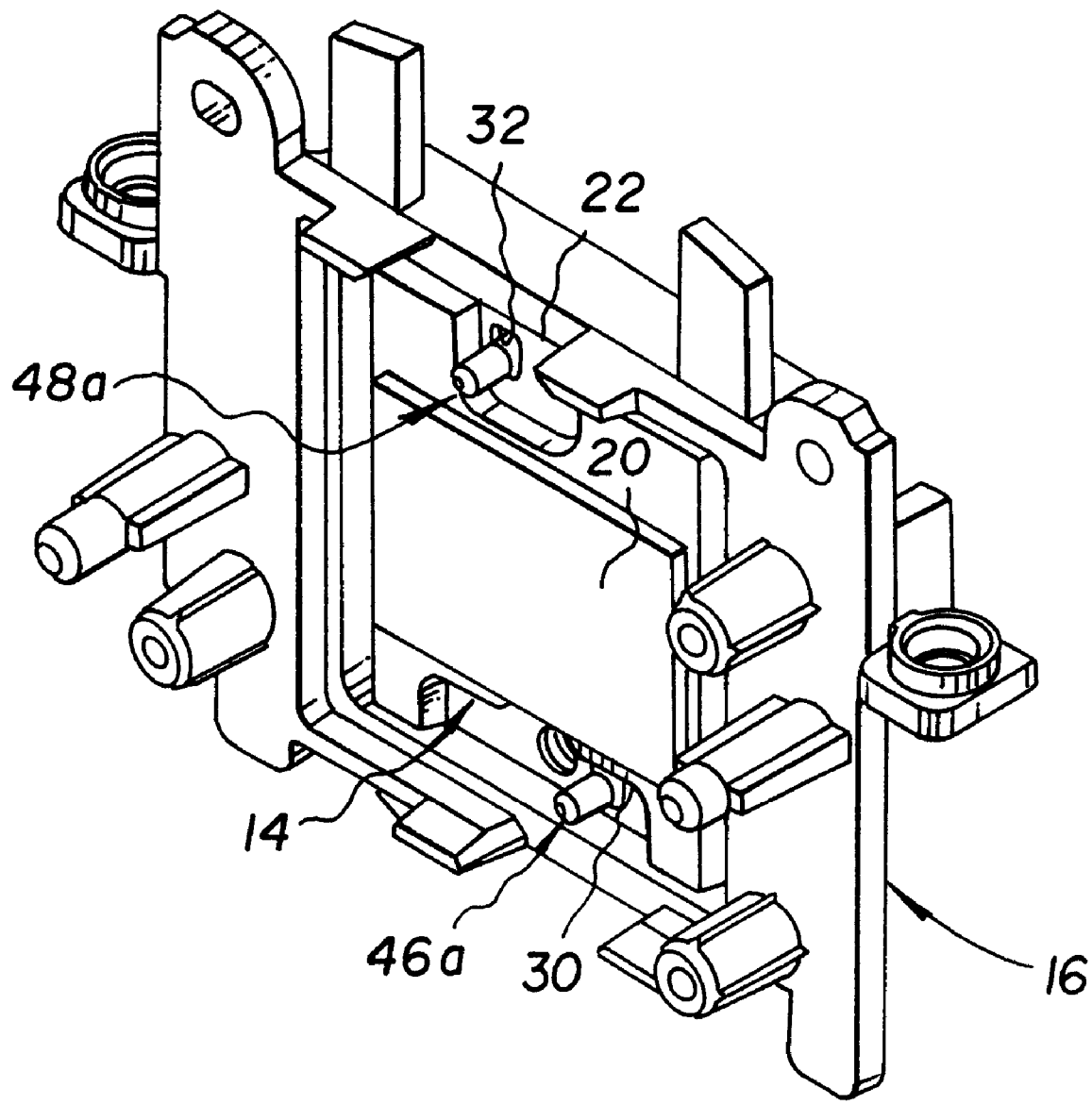
FIG. 3 is an illustration of an image sensor supported in the sensor mounting frame.

FIG. 2 also shows the features on the optics base mechanism 12 and the sensor mounting frame 16 that provide x-y orientation of the lead frame 22 perpendicular to the optical axis 28 when the product is fully assembled. More specifically, the sensor mounting frame 16 includes two frame-related x-y locating features 46a and 48a, which in particular constitute two locator pins. The optics base mechanism 12 includes two optics-related x-y locating features 46b and 48b, which in particular constitute two locator holes. The features 46a and 46b, and 48a and 48b are respectively positioned to oppose each other in the assembled product, such that the pins 46a and 48a penetrate the holes 30 and 32 in the lead frame 16 and seat into the locator holes 46b and 48b. As shown in FIG. 3, the holes 30 and 32 are dimensioned relative to the correct x-y orientation of the CCD 20, and the pins 46a and 48a establish the x-y positioning of the image sensor assembly 14 relative to the optics base mechanism 12.

Figure 6:
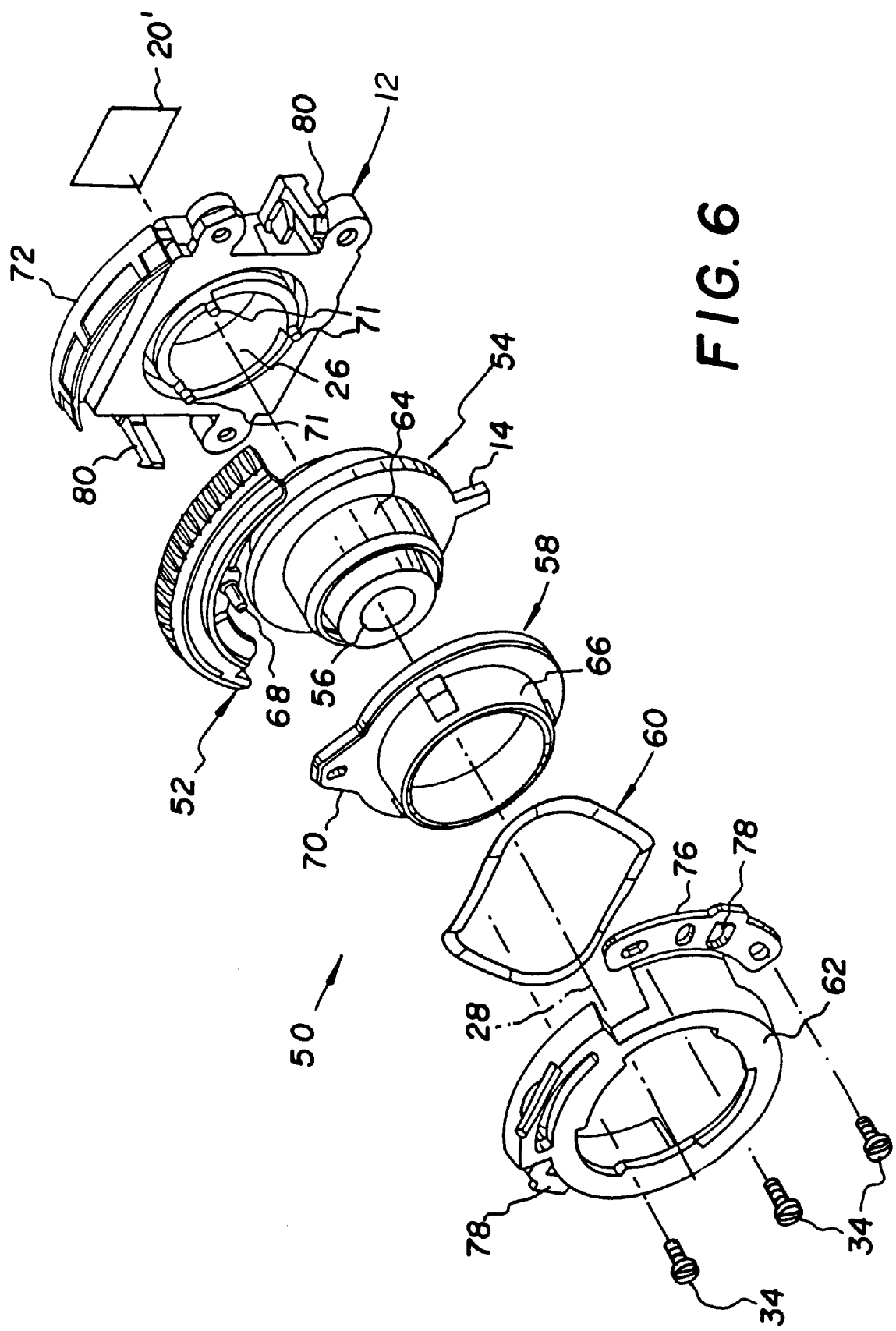
FIG. 6 is an exploded view of an optical assembly of a type incorporating the optics base mechanism shown in FIG. 1.

An exploded view of an optical assembly 50 for use with the invention is shown in FIG. 6. The optical assembly 50 is mounted upon the optics base mechanism 12 and further includes a focus adjuster 52 for user focus, a lens assembly 54 supporting a lens 56 for focusing an image, a focus ring 58, a lens spring 60 and a lens retainer 62 for holding the assembly together. These parts are assembled along the optical axis 28 (z-axis assembly), which intercepts an image plane 20', where the CCD 20 is located. The lens 56 thus focuses an image upon the CCD 20. The screws 34 are used to fasten the lens retainer 62 to the base mechanism 12.

The lens 56 is mounted within the lens assembly 54 in a barrel 64 that fits, on one end thereof, into the opening 26 in the optics base mechanism 12 and, on its other end thereof, into an extension 66 of the focus ring 58. The focus adjuster 52 includes a pin 68 that mates with a hole in a tab 70 extending from the focus ring 58. When assembled, the focus ring 58 is fastened to the lens assembly (with, e.g., glue) and the focus adjuster 52 is supported for movement over a shoulder 72 attached to the optics base mechanism 12. Three ramps (not shown) on the lens assembly 54 about three spherically surfaces focusing posts 71 on the optics base mechanism 12, and sliding motion between the ramps and the posts 71 cause focusing of the lens 56. The lens assembly 54 also includes a focus tab 74 for adjusting the lens assembly 54 during factory focus. The lens retainer 62 includes retaining flanges 76 that include holes 78 for receiving mounting clips 80 extending from the optics base mechanism 12.

Consequently, the same features 46a and 48a on the sensor mounting frame 16 that locate the image sensor assembly 14 also locate the optics base mechanism 12 and, therefore, the optical assembly 50 that is mounted to the optics base mechanism 12. Although this aspect does not correct lens/CCD tilt, it does establish the X-Y positioning of the lens 56 to the CCD 20. Proper X-Y positioning of the lens 56 to the CCD is another important attribute of a digital camera. If the distance between the lens centerline (the z-axis 28) and the CCD centerline is too large, there will be a significant difference in the corner illumination of the image due to the light fall-off of the lens 56. This is another advantage of this design relative to the prior art design that utilizes a CCD plate (since two different features are ordinarily used in the prior art to locate the image sensor assembly to the plate and the plate to the optics base mechanism).

Figure 4:
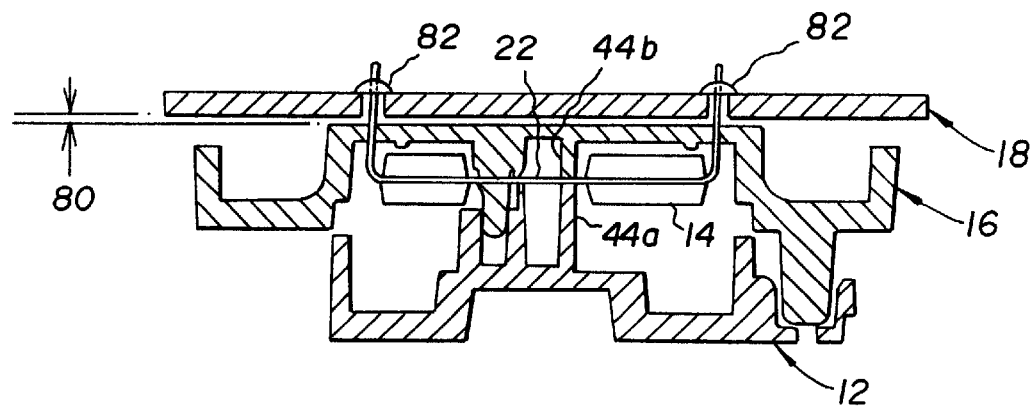
FIG. 4 is a cross section of an assembled sensor package assembly.
Figure 5A:
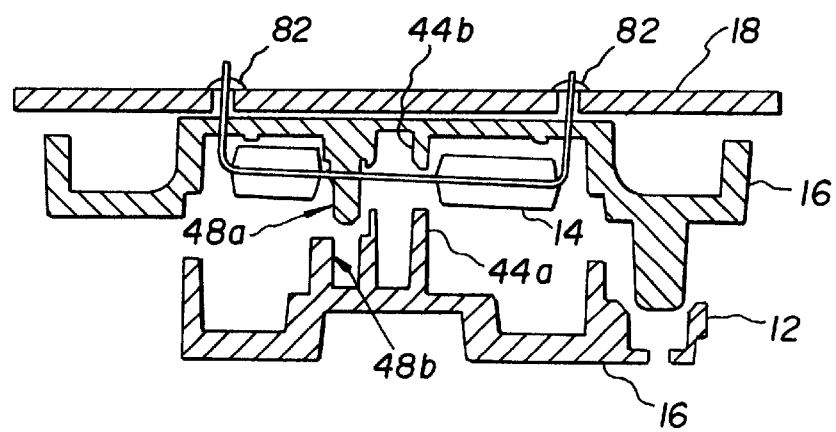
FIGS. 5A and 5B are cross sections of a sensor package assembly, showing the effect of mounting an image sensor that has been skewed in its attachment to a circuit board.
Figure 5B:
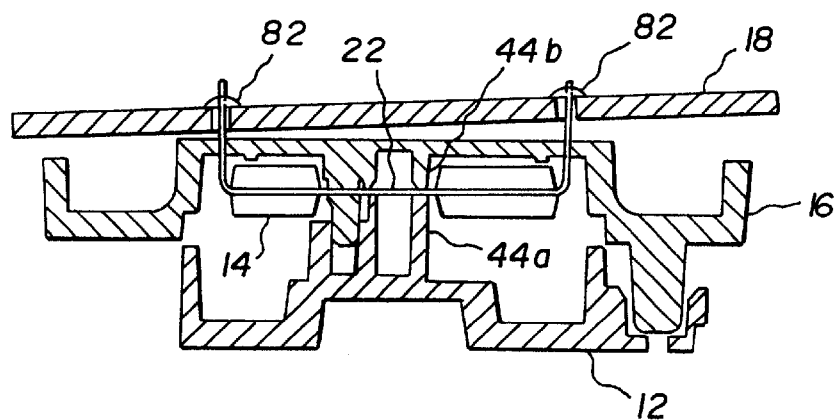

During assembly, the image sensor assembly 14 is first located on the sensor mounting frame 16 so that the electrical leads 24 pass through the sensor mounting frame 16 and are soldered to the circuit board 18. By subsequently fastening down the sensor mounting frame 16 to the optics base mechanism 12, the xyz axes are fixed without regard to the relation between the image sensor assembly 14 and the circuit board 18, i.e., the circuit board "floats" with respect to the other components of the sensor package assembly 10 and the optical assembly 50. Consequently, according to another feature of invention, as shown in FIG. 4, there is some space 82 between the circuit board 18 and the sensor mounting frame 16 after solder connections 84 have been made. If for some reason the image sensor assembly 14 is not fully seated when it is soldered to the circuit board 18 (as shown in FIG. 5a), the circuit board 18 will tip (as shown in FIG. 5b) when the remainder of the assembly is completed because the lead frame 22 is pinched between the respective locator posts 40a and 40b, 42a and 42b, and 44a and 44b of the sensor mounting frame 16 and the optics base mechanism. (FIGS. 5A and 5B show only the pinching action of the hollow posts 44a and 44b, but it should be understood that the other posts are similarly pinching the lead frame 22.) The space 82 shown in FIG. 4 is intentionally provided to allow this tilting to occur. If there were no space or insufficient space, the sensor mounting frame 16 would hit the circuit board 18, which could place a considerable stress on the solder joints and potentially distort the lead frame 22.

It is important for the optics base mechanism 12, and not the circuit board 18, to be located and attached to the camera encasements (not shown) via, e.g., the screws 35 (see FIG. 1). (The circuit board 18 would ordinarily be connected by flex cable or like non-constraining connections to other circuits.) If the circuit board 18 is also attached to the camera encasements, then the assembly is over constrained and could result in unacceptable stress being applied to the circuit board 18. Also, if the circuit board 18 alone were attached to the camera encasements, then the lens pointing (relative to the encasements or a viewfinder) would not be controlled since the circuit board 18 can tip somewhat relative to the optics base mechanism 12. It is also important, for correct alignment of the lens 56 to the CCD 20, that the plane defined by the three spherical surfaces on the ends of the focusing posts 71 be substantially parallel to the plane defined by the pinch points between the features 40a and 40b, 42a and 42b, and 44a and 44b.

The invention has been described with reference to a preferred embodiment. However, it will be appreciated that variations and modifications can be effected by a person of ordinary skill in the art without departing from the scope of the invention.

PARTS LIST 10 sensor package assembly
12 optics base mechanism
14 image sensor assembly
16 sensor mounting frame
18 printed circuit board
20 CCD
20' image plane
22 lead frame
24 electrical leads
26 opening
28 optical axis
30 hole
32 hole
34 screws
35 screws
40a optics-related tilt locator post
40b frame related tilt locator post
42a optics-related tilt locator post
42b frame related tilt locator post
44a optics-related tilt locator post
44b frame related tilt locator post
46a optics-related locator post
46b locator hole
48a optics-related locator post
48b locator hole
50 optical assembly
52 focus adjuster
54 lens assembly
56 lens
58 focus ring
60 lens spring
62 lens retainer
64 barrel
66 extension
68 pin
70 tab
71 focusing post
72 shoulder
74 focus tab
76 retaining flanges
78 hole
80 mounting clip
82 space
84 solder connections

What is claimed is:

1. A sensor package assembly for use with an optical assembly, said sensor package assembly comprising:
a lead frame;
an image sensor mounted on the lead frame and defining an image plane, said image sensor including leads extending from the lead frame;
an optics base mechanism for supporting the optical assembly in relation to an optical axis, said optical assembly comprising multiple optics-related parts, said optics base mechanism having at least three optics-related locator features positioned to define a first plane substantially parallel to the image plane;
a sensor mounting frame for locating and supporting the image sensor in relation to the optical axis, said sensor mounting frame having an opening for allowing the leads to extend through and at least three frame-related locator features protruding therefrom and positioned to define a second plane substantially parallel to the image plane; and
means for fastening the optics base mechanism and the sensor mounting frame together with the image sensor interposed therebetween such that each of the optics-related locator features is oriented in opposed relation to a corresponding one of the frame-related locator features with the lead frame pinched between opposing surfaces of the optics-related locator features and the frame-related locator features, so that the optical axis is substantially perpendicular to the first, second, and image planes to reduce tilt of the image sensor relative to the optical axis.

2. A sensor package assembly as claimed in claim 1 wherein the optics base mechanism and the sensor mounting frame each further include at least two x-y locating features which cooperate with each other to control the location of the image sensor within an x-y plane perpendicular to the optical axis.

3. A sensor package assembly as claimed in claim 2 wherein the x-y locating features include two pins on the sensor mounting frame and two complementary locator holes on the optics base mechanism, said image sensor including two holes in the lead frame positioned to receive the pins when the image sensor is interposed between the optics base mechanism and the sensor mounting frame.

4. A sensor package assembly as claimed in claim 3 wherein the pins, locator holes, and the holes in the lead frame are dimensioned so as to align a centerline of the image sensor with a centerline of the optical assembly.

5. A sensor package assembly as claimed in claim 1 wherein the sensor package further includes a circuit board that is connected to the leads extending through the opening in the sensor mounting frame, whereby positioning of the image sensor on the circuit board is not critical.

6. A sensor package assembly as claimed in claim 5 wherein a space is maintained between the circuit board and the sensor mounting frame such that there is room for the circuit board to tilt relative to the sensor mounting frame when the sensor package assembly is completed.

7. A method for assembling a sensor package for use with an optical assembly, said method including the steps of:

mounting an image sensor on a lead frame, said image sensor defining an image plane and including leads extending from the lead frame;

supporting said image sensor on a sensor mounting frame in relation to an optical axis, said sensor mounting frame having an opening for allowing the leads to extend through and at least three frame-related locator features protruding therefrom and positioned to define a first plane substantially parallel to the image plane;

supporting the optical assembly on an optics base mechanism in relation to the optical axis, said optical assembly comprising multiple optics-related parts, said optics base mechanism having at least three optics-related locator features positioned to define a second plane substantially parallel to the image plane; and fastening the optics base mechanism and the sensor mounting frame together with the image sensor interposed therebetween such that each of the optics-related locator features is oriented in opposed relation to a corresponding one of the frame-related locator features with a lead frame of the image sensor pinched between opposing surfaces of the optics-related locator features and the frame-related locator features, so that the optical axis is substantially perpendicular to the first, second, and image planes to reduce tilt of the image sensor relative to the optical axis.

* * * * *